(No Model.)
W. JONES.
FEEDER FOR HEATERS.
No. 463,902. Patented Nov. 24, 1891.
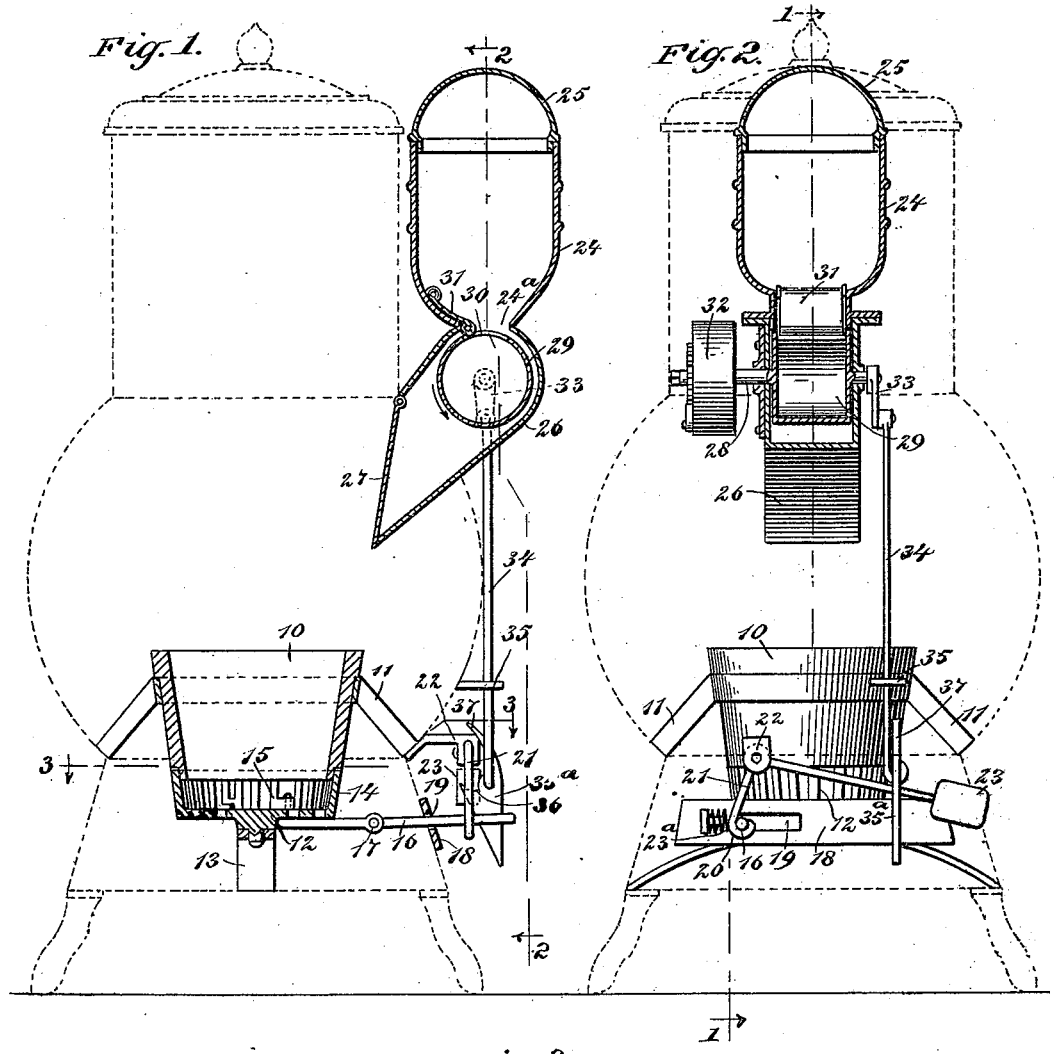
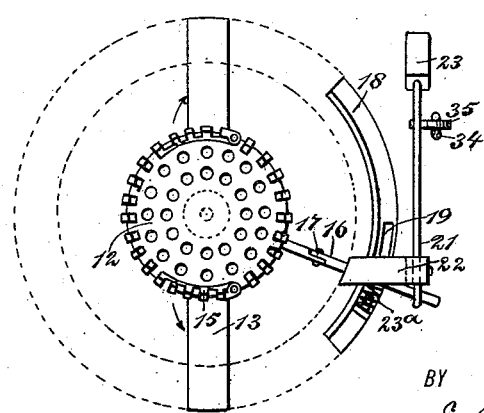
WITNESSES:
INVENTOR
W. Jones
BY
Munn & Co
ATTORNEYS.

UNITED STATES PATENT OFFICE.

WILLIAM JONES, OF LA GRANDE, OREGON.

FEEDER FOR HEATERS.

SPECIFICATION forming part of Letters Patent No. 463,902, dated November 24, 1891.

Application filed May 25, 1891. Serial No. 393,990. (No model.)

*To all whom it may concern:*

Be it known that I, WILLIAM JONES, of La Grande, in the county of Union and State of Oregon, have invented a new and Improved Feeder for Heaters, of which the following is a full, clear, and exact description.

My invention relates to improvements in feeders for stoves, furnaces, and other coal-burning heaters; and the object of my invention is to produce a simple device which will automatically feed a desired amount of fuel into the heater, which will also shake the grate of the heater, so as to prevent the accumulation of ashes, and which will prevent the generation and escape of gas.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a vertical section of the device, showing the same applied to a stove, the outline of the stove being produced in dotted lines and the section being taken on the line 1 1 of Fig. 2. Fig. 2 is a vertical section on line 2 2 of Fig. 1, and Fig. 3 is a horizontal section on the line 3 3 of Fig. 1.

The heater, as shown in the drawings, is provided with a tapering fire-pot 10 of circular cross-section, which is supported on suitable arms 11 and which is provided with an oscillating grate 12, the grate being supported upon a cross-brace 13. The shape of the fire-pot is not essential, however, and when applied to furnaces it may be made of different shape, if desired. The grate 12 is not intended to tip, but is adapted to be oscillated horizontally on its bearing, so as to shake the ashes through it, and it is provided with upwardly-extending side arms 14, which fit a shoulder on the lower edge of the fire-pot, and to provide for the removal of clinkers it is provided in the front with a swinging door 15. The grate is provided with a laterally-extending arm 16, which is jointed at the center, as shown at 17, so as to permit the outer portion to be moved vertically when necessary, and the outer end of the arm is supported in a strip 18, which has a longitudinal slot 19, through which the arm 16 extends and which provides for lateral movement of the arm. The arm 16 may be oscillated by hand to shake the grate; but it usually rests in a hook formed on the lower end of the short arm 20 of the bell-crank 21, which crank is pivoted at its elbow in a support 22 and carries at its free end a weight 23, and the weight normally holds the upper member of the arm depressed and swings the short member and the rod 16 to one end of the slot 19, as shown in Fig. 2. The feeding mechanism is adapted to raise the long end of the bell-crank and to drop it suddenly, and in order that the arm 16 may be caused to vibrate or oscillate a spring 23ª is arranged at one end of the slot 19 so as to impinge upon the arm.

The mechanism for raising and releasing the bell-crank will be described hereinafter. A hopper 24 is arranged outside of the heater and above the fire-pot, and this hopper is provided at its lower end with an opening 24ª and at its upper end with a removable cover 25. The opening 24ª leads into a chute 26, which extends through the wall of the heater and delivers into the fire-pot, and the inner end of the chute is normally closed by a swinging door 27, which is pivoted upon the upper wall of the chute, and when the coal is dropped through the chute it will raise the door, and after the coal passes the door will immediately close, so that the gas from the fire-pot cannot enter the chute and pass up through the hopper. A shaft 28 extends through the upper portion of the chute and is held to turn in suitable bearings, and mounted centrally on the shaft within the chute is a cylindrical bucket 29, which turns immediately beneath the outlet 24ª of the hopper 24, and which has on one side an opening 30, so that when this opening is arranged beneath the hopper the coal from the hopper will flow into it, and when the bucket is turned over the coal will run out of the opening 30 and be delivered through the chute 26 into the fire-pot. A tongue 31 is pivoted in the lower portion of the hopper 24 and extends downward through the outlet 24ª, and this prevents the coal in the bucket 29 from clogging, as when the bucket turns the projecting lumps of coal will strike the tongue and the tongue will yield so as to permit the coal to pass, and will also level the coal so that the bucket may turn easily.

On one end of the shaft 28 is a clock-work mechanism 32, which is adapted to turn the shaft. This mechanism I have not shown in detail, and it is obvious that any well-known form of spring-motor or clock-work mechanism may be applied to the shaft so as to turn it, and it should be timed so that the shaft will turn only often enough to supply the fire with fuel. It is advisable to have the bucket 29 not too large and have the shaft turn comparatively often, so as to supply small quantities of fuel at frequent intervals, as in this case a better fire is maintained than if larger quantities of fuel were supplied at less frequent intervals.

At the end of the shaft 28 opposite the clock-work mechanism 32 is a crank 33, to which is secured a depending connecting-rod 34, which is held to move vertically in a suitable guide 35, and this connecting-rod has loosely suspended at its lower end a block $35^a$, which has on one side a hook 36 to engage the upper arm of the bell-crank 21, and which has at its upper end an elongated finger 37, which is bent to extend above the hook 36. The guide 35 is arranged far enough above the block $35^a$ to permit the block to be raised sufficiently to oscillate the bell-crank 21 and the arm 16, and when the bell-crank has been moved far enough to swing the arm 16 nearly the entire length of the slot 19 the finger 37 will contact with the guide 35, and the block $35^a$ will thus be tilted, so as to release the bell-crank. The weight 23 will then drop, so as to swing the bell-crank and arm 16 back to their normal position, and the sudden movement will bring the arm against the spring $23^a$, and the opposite pressures of the spring and the weight will cause a vibrating movement of the arm 16, which movement will be communicated to the grate 12, thus shaking the grate. It will be seen, then, that every time the shaft 28 is turned and a charge of fuel delivered into the fire-pot the grate 12 will be shaken, and the fire-pot will thus be kept free of ashes, so that a bright hot fire will be constantly maintained.

In practice the hopper 24 should hold fuel enough to last for twenty-four hours, and the driving mechanism of the shaft 28 should be arranged to deliver the fuel at necessary intervals, and then the heater will take care of itself.

Having thus fully described my invention, I claim as new and desire to secure by Letters Patent—

1. The combination, with a heater, of a chute arranged to deliver into the fire-pot and carrying a hopper at its upper end, a revoluble bucket mounted in the upper end of the chute and beneath the hopper, said bucket having an opening on one side, and a tongue pivoted in the hopper and extending into the path of the bucket, substantially as described.

2. The combination, with a fire-pot having an oscillating grate, of a chute arranged to deliver into the fire-pot and carrying a hopper at its upper end, a revoluble bucket arranged in the chute and beneath the fire-pot, and a lever mechanism for shaking the grate at each revolution of the bucket, substantially as described.

3. The combination, with a revoluble feed-bucket, a fire-pot, and an oscillating grate having a laterally-extending arm, of a bell-crank pivoted beneath the bucket, said crank having one arm connected with the grate-arm and the opposite arm provided with a weight, and a crank connection between the feed-bucket shaft and the bell-crank, substantially as described.

4. The combination, with a fire-pot and an oscillating grate having a laterally-extending arm, of a revoluble feed-bucket, a bell-crank having one arm connected with the grate-arm and the opposite arm provided with a weight, a crank secured to the bucket-shaft and provided with a depending connecting-rod, a block pivoted to the connecting-rod, said block having a hook to engage the bell-crank, and a finger curved to extend above the hook, and a trip for the finger, substantially as shown and described.

5. The combination, with a revoluble bucket, a fire-pot, and an oscillating grate having a laterally-extending arm, of a weighted bell-crank pivoted above the arm and connected therewith, a spring arranged to impinge on one side of the arm, and means for raising and tripping the bell-crank by the movement of the revoluble bucket, substantially as described.

WILLIAM JONES.

Witnesses:
RICHARD N. JONES,
ALBERT T. ELLIS.